Feb. 27, 1934.    H. E. WANER    1,949,066
SLITTING MACHINE
Filed Oct. 31, 1933

Inventor
Harry E. Waner
By Eakin & Avery
Attys.

Patented Feb. 27, 1934

1,949,066

UNITED STATES PATENT OFFICE 1,949,066

SLITTING MACHINE

Harry E. Waner, Akron, Ohio, assignor to The B. F. Goodrich Company, New York, N. Y., a corporation of New York Application October 31, 1933. Serial No. 696,044

6 Claims. (Cl. 164—61)

This invention relates to apparatus for slitting sheet material into narrow bands, and is especially useful in the production of narrow bands or tapes of vulcanized or unvulcanized rubber.

The principal objects of the invention are to provide for equalization of pressure over a plurality of cutters mounted on the same shaft, to provide equalization regardless of eccentricity of the cutters or flexing of the shaft, to accomplish division of a wide sheet into extremely narrow bands, to maintain uniform width of the bands, and to provide for cutting the bands by a pinch cut.

Other objects will appear from the following description and the accompanying drawing.

Figure 1:
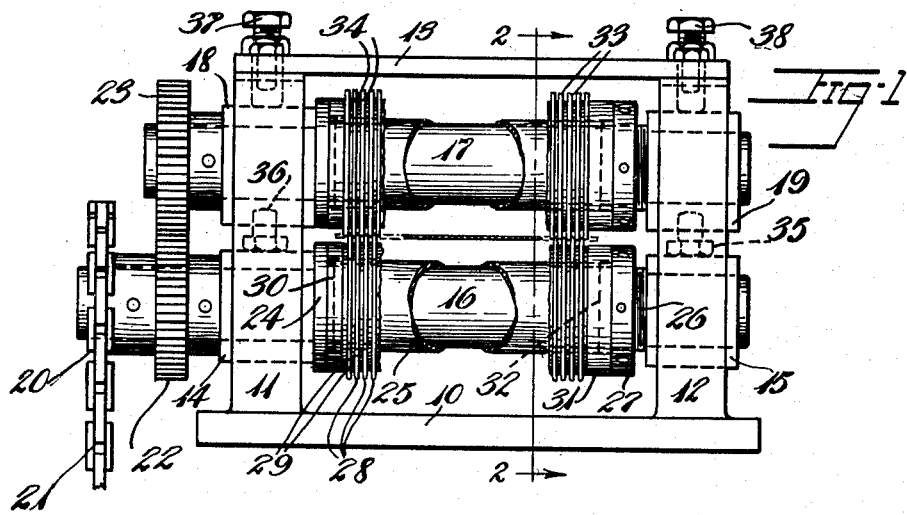
Fig. 1 is a front elevation of a preferred form of the cutting device, part of the cutters being removed and part of the cushions being broken away to show the construction.
Figure 2:
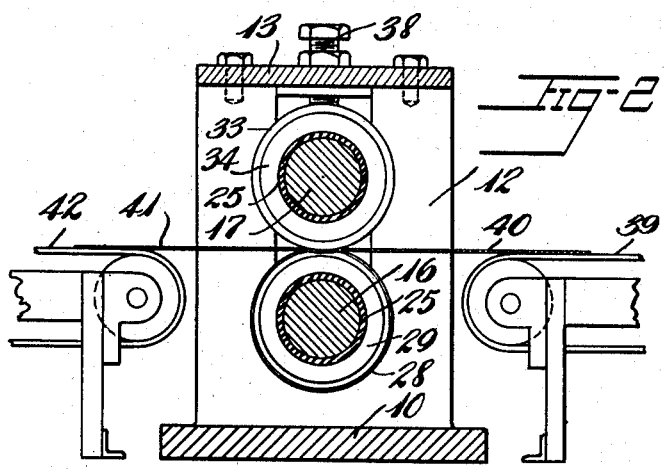
Fig. 2 is a sectional view taken on line 2—2 of Fig. 1, and, in addition, showing parts of conveyors for delivering the sheet and receiving the bands, other parts being broken away.

Referring to the drawing, the numeral 10 designates a bed plate provided with vertically slotted frame members 11, 12 connected at their upper extremities by a tie bar 13. Members 11, 12 are fitted with boxes 14, 15 which engage their slotted portions and provide means for journalling a lower cutter arbor 16. The upper arbor 17 is rotatably mounted in boxes 18, 19 adapted to slide vertically in the slotted frame members.

The lower arbor is provided with a sprocket 20 whereby it may be driven from a convenient source of power (not shown) by a chain 21. It is also provided with a pinion 22 which meshes with a similar pinion 23 on the upper arbor whereby that arbor is driven in unison with the lower arbor.

To restrain the arbor from end movement, and for other purposes, the lower arbor 16 has an integral collar 24 adjacent the inner extremity of the box 14. This collar also acts as a shoulder to retain the cutters.

To cushion the cutters and to compensate for deflection and eccentricity, a sleeve 25 of resilient rubber extends over the arbor 16 throughout substantially the distance between the collar 24 and the box 15. Adjacent the box 15, however, the arbor is threaded as at 26 and a correspondingly threaded collar 27 is mounted thereon to clamp the cutters and compress the cushion.

The cutter arrangement on the lower arbor comprises a plurality of hardened steel discs 28 having convex V-shaped peripheries and having a large enough central aperture to pass over the cushion 25. A series of spacer rings 29 of smaller outside diameter are located each between two cutter discs.

To hold the cutter discs in place a loose collar 30 having a central opening as large as the diameter of the rubber cushion is located between one end of the rank of cutters and the collar 24 and a similar loose collar 31 is located between the other end of the rank of cutters and the threaded collar 27. Collar 27 is provided with a reduced shoulder portion 32 which extends partly through the opening in collar 31 so as to engage the end of the rubber cushion. With the cutters in place, collar 27 is screwed toward the cutters, and engaging the end of the cushion compresses the cushion axially. As rubber is practically incompressible volumetrically but distorts under pressure, the endwise compression of the cushion causes a thickening of the walls whereby the cutters are frictionally engaged against rotative movement with relation to their arbor. Any slight eccentricity of the cutters is compensated by the ability of the cutters individually to move perpendicular to the axis of the arbor, the rubber displaced by any such movement toward the axis acting to raise adjoining cutters to the same radial altitude.

The construction of the cutter holding means on the upper arbor is similar but the cutters are of different contour. The cutters 33 are preferably square-faced providing corners which engage the beveled shoulders of the cutters 28 and pinch the sheet material to the point of separation. Each square faced cutter is arranged between two cutters 28 and spacer discs 34 are provided between each pair of cutters 33. The cutters 33 are cushioned and frictionally held in the same manner as the cutters 28.

In order to maintain the arbors in proper relation, spacing screws 35, 36, are threaded to engage threaded openings in boxes 18 and 19, and their heads engage the boxes 14 and 15. Pressure screws 37, 38 are threaded through the tie-bar 13 and engage the boxes 18, 19.

Figure 3:
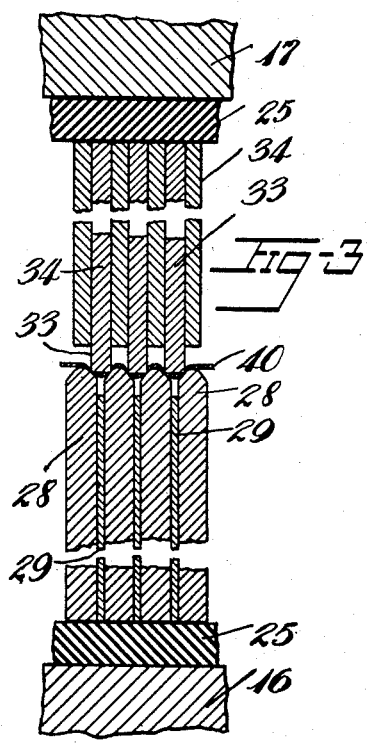
Fig. 3 is a detail sectional view taken in the plane of the axes of the cutter arbors, and showing a sheet of material between the cutters, only a small number of the cutters being shown, and only the adjacent portions of the supporting cushions and mandrels being shown, other parts being broken away.

The material to be cut is delivered in a wide sheet, a conveyor 39 being provided to lead the sheet 40 between the arbors. As the material passes between the cutters, the convex faces of the discs 28 stretch the sheet laterally to form longitudinal corrugations therein, as shown in Fig. 3. The lateral stretching effects separation of the strips as they are cut by pressure between the corners of the discs 33 and the beveled faces of the discs 28. The finished strips 41 are received by a conveyor 42 as they pass from the machine.

The cushion rubber, on which the cutters are mounted, not only compensates for eccentricity of the cutters, but also compensates for any deflection of the arbors. The cushioning structure is such that relatively thin cutter discs 28, 33, may be used and therefore tapes of very narrow width may be produced.

I claim:

1. Apparatus for slitting sheet material, said apparatus comprising a pair of parallel rotatable arbors, at least one of said arbors being surrounded by a resilient rubber cushion, and having a plurality of disc cutters mounted on said cushion for rolling engagement with anvil means carried by the other arbor.

2. Apparatus for slitting sheet material, said apparatus comprising a pair of parallel rotatable arbors, each arbor having a cylindrical cushion of resilient rubber mounted thereon, and a plurality of discs carried by each cushion for cooperation with the cutting discs similarly mounted on the other arbor.

3. Apparatus for slitting sheet material, said apparatus comprising a pair of parallel rotatable arbors, cutting means carried by one arbor, a resilient rubber cushion located between the cutting means and its arbor, anvil means carried by the other arbor, and a resilient cushion located between the second arbor and the anvil means.

4. Apparatus for slitting sheet material, said apparatus comprising a pair of parallel rotatable arbors, a plurality of discs mounted on one arbor in spaced relation, each disc having a periphery convex in cross-section, a plurality of discs mounted on the arbor in spaced relation, each of said last named discs having a cylindrical periphery and being mounted to contact at its edges with the shoulders of two adjacent discs on the other arbor.

5. Apparatus for slitting sheet material, said apparatus comprising a rotatable arbor, a resilient rubber cushion surrounding said arbor, a plurality of cutting discs surrounding said cushion in spaced relation, means for axially compressing said cushion whereby it is thickened frictionally to retain said discs, and rotatable means for cooperating with said discs for cutting the sheet material.

6. Apparatus for slitting sheet material, said apparatus comprising a rotatable arbor, a resilient rubber cushion surrounding said arbor, a plurality of cutting discs surrounding said cushion in spaced relation, each of said discs having a cylindrical periphery having cutting edges, means for axially compressing said cushion to frictionally retain said discs on said arbor, a second arbor mounted parallel to the first named arbor, and a plurality of anvil discs carried thereby in spaced relation, each anvil disc having a periphery convex in cross-section and contacting with the edges of two of said cutting discs.

HARRY E. WANER.